US012070838B2

(12) United States Patent
Leupert et al.

(10) Patent No.: US 12,070,838 B2
(45) Date of Patent: Aug. 27, 2024

(54) HAND-HELD POWER TOOL HAVING A TORQUE SETTING DEVICE

(71) Applicant: Robert Bosch GmbH, Stuttgart (DE)

(72) Inventors: Markus Leupert, Murrhardt (DE); Achim Wurst, Murrhardt (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 17/799,667

(22) PCT Filed: Jan. 26, 2021

(86) PCT No.: PCT/EP2021/051751
§ 371 (c)(1),
(2) Date: Aug. 13, 2022

(87) PCT Pub. No.: WO2021/164996
PCT Pub. Date: Aug. 26, 2021

(65) Prior Publication Data

US 2023/0072710 A1 Mar. 9, 2023

(30) Foreign Application Priority Data

Feb. 17, 2020 (DE) ..................... 10 2020 201 947.9
Jun. 3, 2020 (DE) ..................... 10 2020 206 936.0

(51) Int. Cl.
*B25B 23/14* (2006.01)
*B25B 23/147* (2006.01)
*B25F 5/00* (2006.01)

(52) U.S. Cl.
CPC .......... *B25B 23/141* (2013.01); *B25B 23/147* (2013.01); *B25F 5/001* (2013.01)

(58) Field of Classification Search
CPC ...... B25B 23/141; B25B 23/147; B25F 5/001
See application file for complete search history.

(56) References Cited

U.S. PATENT DOCUMENTS 8,528,658 B2 * 9/2013 Roehm ................ B25D 16/003 173/176
9,168,651 B2 * 10/2015 Hecht .................. F16D 43/206
(Continued)

FOREIGN PATENT DOCUMENTS

DE 10 2006 000 545 A1 6/2008
DE 10 2008 041 599 A1 3/2010
(Continued)

OTHER PUBLICATIONS

International Search Report corresponding to PCT Application No. PCT/EP2021/051751, mailed Apr. 23, 2021 (German and English language document) (5 pages).

*Primary Examiner* — Nathaniel C Chukwurah
(74) *Attorney, Agent, or Firm* — Maginot, Moore & Beck LLP

(57) ABSTRACT

A hand-held power tool, in particular a screwdriver, includes a housing, in which at least one drive unit for driving a tool holder is arranged, the tool holder being designed to hold an insertion tool. The hand-held power tool further includes a torque setting device for setting a specified torque at least within specified limits. The torque setting device has a screw thread region and a spring-loaded setting unit for setting the specified torque. The setting unit is operatively connected to the screw thread region. The torque setting device is assigned a compression spring which is coaxial to the screw thread region. The compression spring is arranged such that the screw thread region surrounds the compression spring at least partly with respect to the axial direction of the drive unit.

20 Claims, 7 Drawing Sheets

(56) References Cited

U.S. PATENT DOCUMENTS

| | | | | |
|---|---|---|---|---|
| 9,908,228 | B2 * | 3/2018 | Elger | B25D 16/003 |
| 9,987,738 | B2 * | 6/2018 | Roehm | B25F 5/001 |
| 2002/0153219 | A1 | 10/2002 | Chen | |
| 2007/0163793 | A1 * | 7/2007 | Aeberhard | H01H 9/20<br>173/48 |
| 2011/0127059 | A1 * | 6/2011 | Limberg | F16D 7/044<br>173/216 |
| 2011/0147022 | A1 | 6/2011 | Roehm et al. | |
| 2011/0188232 | A1 * | 8/2011 | Friedman | F21S 9/04<br>362/119 |
| 2014/0116833 | A1 | 5/2014 | Techt et al. | |
| 2019/0283222 | A1 * | 9/2019 | Thorson | B25B 23/141 |

FOREIGN PATENT DOCUMENTS

| | | | |
|---|---|---|---|
| DE | 10 2009 027 951 | A1 | 1/2011 |
| DE | 10 2016 203 886 | A1 | 9/2017 |
| EP | 3 346 087 | A1 | 7/2018 |
| WO | 2017/190523 | A1 | 11/2017 |

* cited by examiner

HAND-HELD POWER TOOL HAVING A TORQUE SETTING DEVICE

This application is a 35 U.S.C. § 371 National Stage Application of PCT/EP2021/051751, filed on Jan. 26, 2021, which claims the benefit of priority to (i) Serial No. DE 10 2020 201 947.9, filed on Feb. 17, 2020 in Germany, and (ii) Serial No. DE 10 2020 206 936.0, filed on Jun. 3, 2020 in Germany, the disclosures of which are incorporated herein by reference in their entirety.

BACKGROUND

The present disclosure relates to a hand-held power tool, in particular a screwdriver, having a housing in which at least one drive unit for driving a tool receptacle is arranged, wherein the tool receptacle is designed to receive an application tool, and having a torque setting device for setting a predefined torque at least within predefined limits, wherein the torque setting device has a threaded region, and a spring-loaded setting unit, operatively connected to the threaded region, for setting the predefined torque.

Such a hand-held power tool having a torque setting device is known from the prior art. The torque setting device has a plurality of spring elements and a threaded region with a setting unit for setting a desired torque. The spring elements and the threaded region are in that case arranged in series or in an axial direction.

SUMMARY

The disclosure relates to a hand-held power tool, in particular a screwdriver, having a housing in which at least one drive unit for driving a tool receptacle is arranged, wherein the tool receptacle is designed to receive an application tool, and having a torque setting device for setting a predefined torque at least within predefined limits, wherein the torque setting device has a threaded region, and a spring-loaded setting unit, operatively connected to the threaded region, for setting the predefined torque. The torque setting device is assigned a compression spring which is arranged coaxially with the threaded region, wherein the compression spring is arranged such that the threaded region at least partially surrounds the compression spring in an axial direction of the drive unit.

The disclosure thus makes it possible to provide a hand-held power tool in which, as a result of the parallel arrangement of the threaded region and of the compression spring, a simple and compact torque setting device can be formed. Thus, in a simple way, a compact hand-held power tool can be provided.

Preferably, the torque setting device has a cylindrical portion for rotatably mounting the tool receptacle and the threaded region, wherein the cylindrical portion and the threaded region are arranged coaxially with one another and a receptacle for arranging the compression spring is arranged in a radial direction between the threaded region and the cylindrical portion.

Thus, a parallel arrangement of the threaded region and the compression spring can be allowed easily and in an uncomplicated manner.

Preferably, the drive unit has a transmission, which is arranged in a transmission housing, wherein the torque setting device is arranged in an output-side region of the transmission housing.

Thus, a stable and robust arrangement of the torque setting device can be allowed, wherein the transmission and the torque setting device form a unit.

Preferably, the threaded region has at least two bars which are spaced apart from one another in the circumferential direction, wherein the setting unit is arranged on an outer periphery of the at least two bars.

Thus, a simple and uncomplicated arrangement of the setting unit on the threaded region can be allowed.

According to one embodiment, the at least two bars at least partially have an external thread on their outer periphery in the axial direction of the drive unit, and the setting unit has an internal thread for forming a screw connection with the at least two bars.

Thus, secure and robust setting of the predefined torque can be allowed.

The setting unit preferably has a setting ring and a spring retaining ring which are connected together, wherein the spring retaining ring is preferably assigned an insert part with at least one clamp portion for fixing the setting ring to the spring retaining ring.

Thus, a compact setting unit can be provided, in which a setting ring for setting a desired torque and a spring force associated with the desired torque is settable by the spring retaining ring. Furthermore, as a result of the connection of the setting ring and of the spring retaining ring, undesired changing of the set torque can be prevented. In this case, a secure and robust, releasable connection between the setting ring and the spring retaining ring can advantageously be formed when using an insert part.

In one embodiment variant, the insert part is assigned a force-fitting element. Preferably, the force-fitting element is arranged on the setting ring, in particular on an end side of the setting ring facing away from the spring retaining ring, in order to prevent the setting ring from rotating by itself by forming a force fit between the insert part and the force-fitting element.

Preferably, the setting unit is movable on the threaded region between a first and a second axial position, wherein the first and the second position are always arranged between a first and second axial end of the compression spring.

Thus, a compact configuration of the torque setting device can be allowed.

According to one embodiment, the spring retaining ring has, for axially acting on the compression spring in a radial direction of the drive unit, at least one, in particular two inwardly directed receiving tabs, wherein the at least one receiving tab is arranged partially in the receptacle.

Thus, a secure and reliable arrangement of the compression spring in the receptacle is allowed, which is preferably formed in the manner of an annular groove.

The at least one receiving tab is preferably arranged in the circumferential direction of the drive unit in a receptacle which is formed between two adjacent bars.

Thus, a parallel arrangement of the setting unit and of the compression spring can be allowed in a simple manner, wherein the setting unit is movable between the first and second axial end of the compression spring.

Preferably, in an embodiment variant, the at least one receiving tab has a portion that is directed outward in a radial direction of the drive unit and is designed to fix the setting ring to the spring retaining ring.

Thus, a connection between the setting ring and the spring retaining ring can be allowed easily and in an uncomplicated manner.

Preferably, a force-fitting element is arranged at least regionally between the setting ring and the spring retaining ring in order to prevent the setting ring from rotating by itself by forming a force fit between the spring retaining ring and the force-fitting element.

Thus, a secure and reliable arrangement of the setting ring can be allowed.

The setting ring preferably has a groove, in particular an annular groove, for at least partially receiving the force-fitting element.

Thus, an arrangement of the force-fitting element can be allowed in a simple manner.

Preferably, force-fitting element has a length in the axial direction of the drive unit that is greater than a depth of the groove.

Thus, a suitable force-fitting element for arranging in the groove can be provided easily and in an uncomplicated manner.

According to one embodiment, the force-fitting element comprises sheet metal, plastic and/or elastomer.

Thus, a robust and reliable force-fitting element can be provided.

The spring retaining ring preferably has a receptacle in which a separate setting tool is able to be arranged, wherein, to set the predefined torque, the setting ring is rotatable in the circumferential direction of the drive unit by being acted upon via the receptacle, and the setting ring is movable in the axial direction of the drive unit by the rotation.

Thus, setting of a desired torque can be allowed in a simple way.

A sleeve is preferably arranged on an outer side of the housing, said sleeve having a cutout assigned to the receptacle of the spring retaining ring, wherein a separate setting tool for setting the predefined torque can pass through the cutout.

Thus, a closure element can be provided easily and in an uncomplicated manner, which can be arranged in a setting position and a closure position, wherein dirt can be prevented from penetrating into the interior of the hand-held power tool in the closure position.

Preferably, a torque clutch having a pressure plate is arranged on a drive-side end side of the receptacle, and the compression spring bears on the pressure plate, wherein the pressure plate is connected to a switching device, and wherein, if the predefined torque is exceeded, a relative movement of the pressure plate in the axial direction of the drive unit activates the switching device for deactivating the drive unit.

Thus, damage to the hand-held power tool on account of too high a torque acting on the drive unit can be prevented easily and in an uncomplicated manner.

BRIEF DESCRIPTION OF THE DRAWINGS

The disclosure is explained in more detail in the following description on the basis of exemplary embodiments illustrated in the drawings, in which.

DETAILED DESCRIPTION

In the figures, elements with an identical or comparable function are provided with the same reference signs and described in detail only once.

Figure 1:
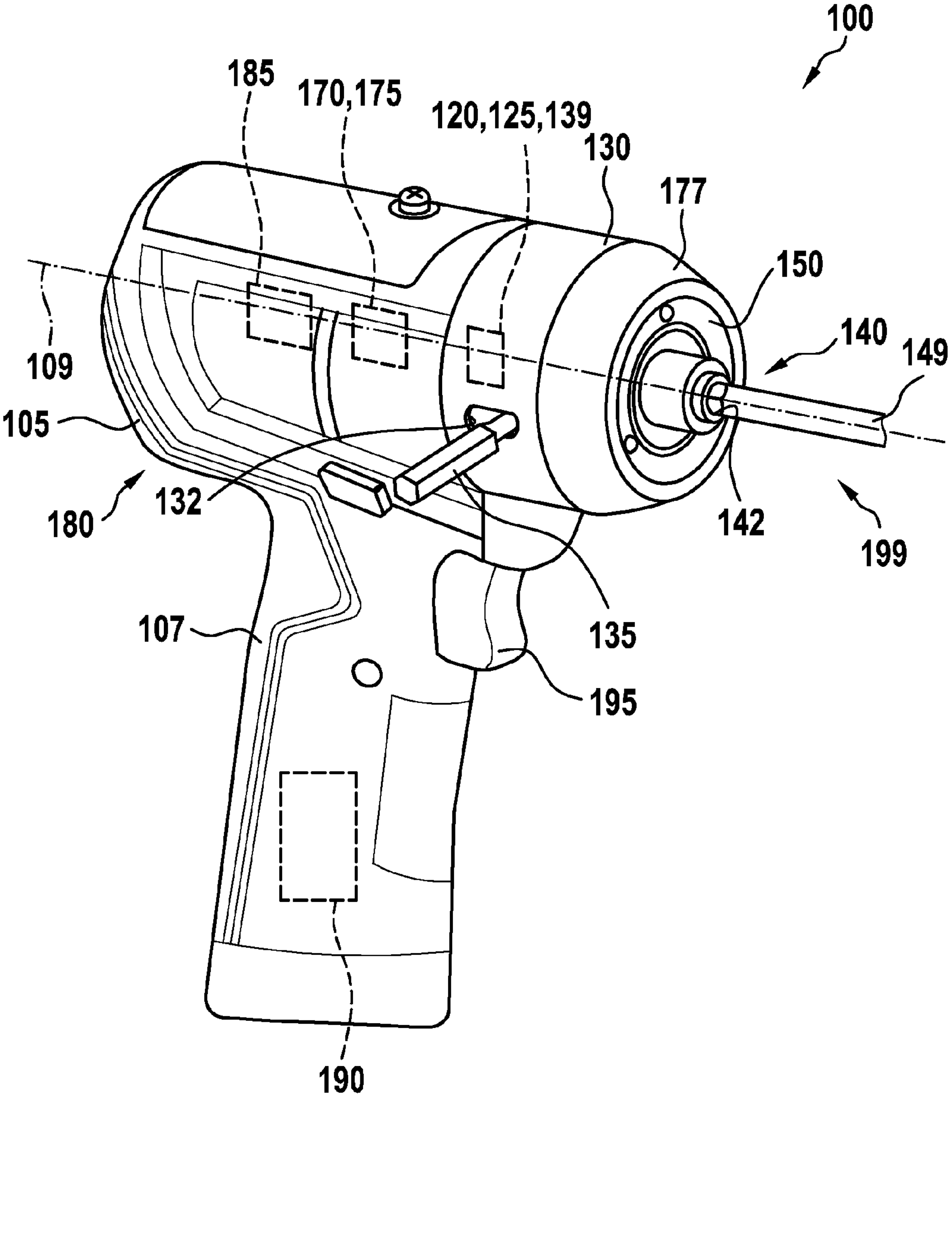
FIG. 1 shows a perspective side view of a hand-held power tool having a drive unit, to which a torque setting device is assigned.

FIG. 1 shows an example of a hand-held power tool 100 with a housing 105, in which preferably a drive unit 180 having at least one drive motor 185 is arranged. The drive unit 180 is designed preferably to drive a tool receptacle 140 in rotation. The tool receptacle 140 is designed to receive an application tool 149. Preferably, the tool receptacle 140 is designed with an inner receptacle 142 for receiving an application tool 149 in the form of a screwdriver bit and/or drilling tool. In operation, the tool receptacle 140 rotates about a longitudinal axis 109.

Preferably, the drive motor 185 is in the form of an electronically commutated motor, but can also be any desired other electric drive motor, for example a brush motor etc. In this case, the drive motor 185 is able to be switched on and off preferably via a manual switch 195. The housing 105 of the hand-held power tool 100 has preferably a handle 107, wherein the manual switch 195 is arranged on the handle 107. Furthermore, the housing 105 has a housing cover 177 on its end side 199 assigned to the tool receptacle 140. As illustrated, the housing cover 177 is in the form of a housing cap.

According to one embodiment, the drive unit 185 is assigned a shiftable transmission 170. The shiftable transmission 170 is preferably in the form of a planetary transmission.

The shiftable transmission 170 is arranged in a transmission housing 175. The transmission housing 175 is arranged in the housing 105. Preferably, the transmission 170 comprises plastic in order to reduce an associated inertia.

Preferably, the hand-held power tool 100 has a torque setting device 139. The torque setting device 139 is designed to set a predefined torque at least within predefined limits, or to set a maximum torque that is able to be applied to the tool receptacle 140.

The torque setting device 139 is preferably assigned a sleeve 130. According to one embodiment, the sleeve 130 is mounted rotatably on the hand-held power tool 100, in particular on the housing cover 177. The sleeve 130 has preferably a cutout 132, through which a separate setting tool 135 for setting a predefinable torque can pass. The sleeve 130 is preferably arrangeable in a setting position, in which the setting tool 135 can pass through the cutout 132, and in a closure position, in which the cutout 132 is closed by the housing cover 177.

The torque setting device 139 is preferably assigned a torque clutch 125. The torque clutch 125 is designed, when the predefined or preset torque is reached, to disconnect a corresponding operative connection between the tool receptacle 140 and a driveshaft assigned to the drive unit 180. The torque clutch 125 is arranged preferably between the transmission 170 and the torque setting device 139. Preferably, the torque setting device 139 and the torque clutch 125 form a shut-off unit 120 for the hand-held power tool 100. In this case, the torque clutch 125, according to one embodiment, is designed not to corotate, since an assigned output shaft (295 in FIG. 2) is mounted rotatably with respect to the torque clutch 125.

Preferably, the torque setting device 139 is arranged in an output-side region (220 in FIG. 2) or at an axial end, facing the end side 199, of the transmission housing 175. Preferably, working area illumination 150 is arranged on the end side 199 of the housing 105. The working area illumination 150 is preferably arranged annularly around the tool receptacle 140. Preferably, the working area illumination 150 and the tool receptacle 140 are arranged coaxially with one another.

Preferably, the hand-held power tool 100 is mechanically and electrically connectable to a rechargeable battery pack 190 in order to be supplied with power independently of the grid, but can alternatively also be operable using grid power, for example. For example, the hand-held power tool 100 is in the form of a screwdriver, in particular of a shut-off screwdriver. However, the hand-held power tool 100 can also be in the form of a drill driver or hammer drill.

Figure 2:
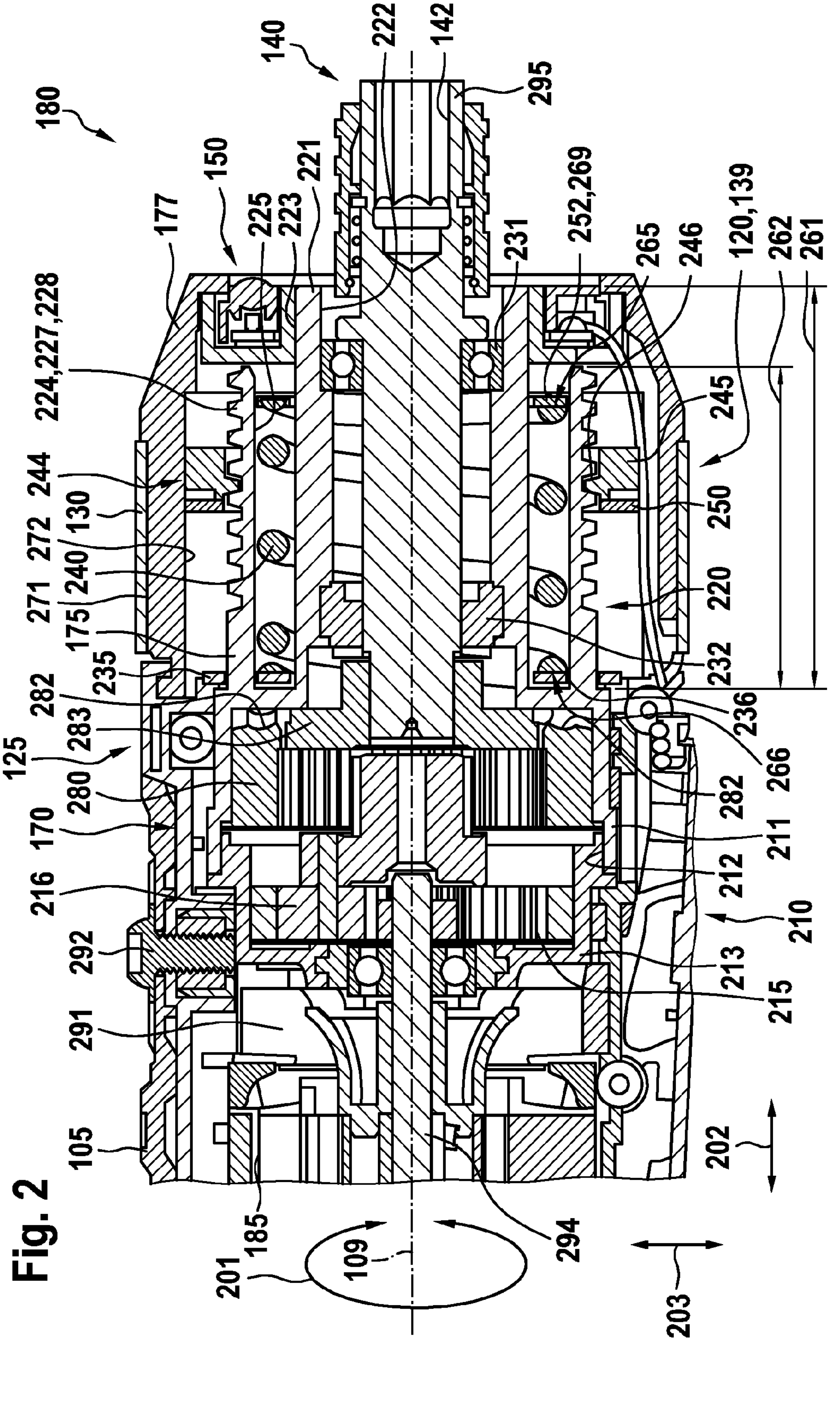
FIG. 2 shows a longitudinal section through the drive unit from FIG. 1.

FIG. 2 shows the drive unit 180 from FIG. 1 with the drive motor 185 and the transmission 170. As illustrated, the drive motor 185 is assigned a driveshaft 294, which drives the shiftable transmission 175, which is preferably in the form of a planetary transmission. Arranged between the drive motor 185 and the transmission 170 is, for example, an optional fan 291.

The transmission 170 is preferably assigned an output shaft 295. Preferably, the tool receptacle 140 is arranged on the output shaft 295.

The transmission 170, or the transmission housing 175, has preferably been introduced into the housing 105 and fixed preferably via at least one screw element 292 in the housing. The transmission housing 175 is preferably formed of multiple parts. Preferably, the transmission housing 175 has a drive-side region 210 facing the drive motor 185, and an output-side region 220 facing the tool receptacle 140. The drive-side region 210 has preferably a transmission cover 213 and a housing portion 211. Preferably, the transmission dower 213 and the housing portion 211 are connected together via a clamped connection. As illustrated, and preferably, the housing portion 211 and the output-side region 220 are formed in one piece.

The transmission housing 175 forms an interior 212. Arranged in the interior 212 are at least one ring gear 215, 280, assigned to the transmission 170 in the form of a planetary transmission, and planets 216. Such planetary transmissions are well known from the prior art and so a detailed description of the planetary transmission will not be given here for the sake of conciseness and clarity of the description.

The output-side region 220 has a cylindrical portion 221. Preferably, the cylindrical portion 221 is designed for rotatably mounting the output shaft 295. The cylindrical portion 221 has an inner receptacle 222 for rotatably mounting the output shaft 295. Preferably, the cylindrical portion 221, in particular the inner receptacle 222, is assigned a drive-side and an output-side bearing element 232, 231. According to one embodiment, the drive-side bearing element 232 is in the form of a plain bearing and/or the output-side bearing element 231 is in the form of a ball bearing.

Furthermore, the output-side region 220 has a threaded region 227. The threaded region 227 at least partially has an external thread 228. The cylindrical portion 221 and the threaded region 227 are preferably arranged coaxially and in this case in particular parallel to one another. In this case, a receptacle 225 is formed in a radial direction 203 of the drive unit 180 between the threaded region 227 and the cylindrical portion 221. According to one embodiment, the receptacle 225 is in the form of an annular groove. Preferably, the cylindrical portion 221 has, in the axial direction 203, a first length 261 and the threaded region 227 has a second length 262, wherein the first length 261 is greater than the second length 262.

According to one embodiment, the torque setting device 139 is arranged in the output-side region 220. The output-side region 220 with the threaded region 227 and the cylindrical portion 221 is assigned to the torque setting device 139. Preferably, the torque setting device 139 has a single compression spring 240 and a setting unit 244 for setting a spring tension of the compression spring 240 in order to specify a predefined torque. Preferably, the spring-loaded setting unit 244 is operatively connected to the threaded region 227.

The compression spring 240 is preferably arranged coaxially with the threaded region 227. Thus, the compression spring 240, as illustrated, is arranged parallel to the threaded region 227. In this case, the compression spring 240 is preferably arranged such that the threaded region 227 at least partially and preferably entirely surrounds the compression spring 240 in the axial direction 202 of the drive unit 180. For this purpose, the compression spring 240 is arranged in the receptacle 225.

Furthermore, the threaded region 227 has preferably at least two bars 224 formed in the axial direction 202 of the drive unit 180. The at least two bars 224 are arranged in a manner spaced apart from one another in the circumferential direction 201 of the drive unit 180. In this case, a receptacle (311 in FIG. 3) is provided between two adjacent bars 224. Preferably, the external thread 228 is formed at least partially on an outer circumference of the at least two bars 224 in the axial direction 202.

The setting unit 244 is preferably arranged on the outer circumference or the external thread 228 of the bars 224. Preferably, the setting unit 244 has an internal thread 246. The external thread 228 of the bars 224 and the internal thread 246 of the setting unit 244 form a screw connection.

Preferably, the setting unit 244 is movable on the threaded region 227 between a first and a second axial position. In this case, the first and the second position are always arranged between a first and second axial end 265, 266 of the compression spring 240. According to one embodiment, the setting unit 244 has a setting ring 245 and a spring retaining ring 250. Preferably, the setting ring 245 has the internal thread 246. The setting ring 245 and the spring retaining ring 250 are preferably connected together.

Preferably, the spring retaining ring 250 has, for axially acting on the compressing spring 240 in a radial direction 203 of the drive unit 180, at least one, in particular two inwardly directly receiving tabs 252. The at least one receiving tab 252 is arranged preferably partially in the receptacle 225, or the annular groove. In this case, the at least one receiving tab 252 is arranged in the circumferential direction 201 of the drive unit 180 in the receptacle (311 in FIG. 3) which is formed between two adjacent bars 224. Preferably, the at least one receiving tab 252 is arranged in a radial direction 203 between the compression spring 240 and the setting ring 245. Preferably, the at least one receiving tab 252 is assigned a washer 269. The washer 269 is designed to prevent undesired widening of the at least one receiving tab 252 by the compression spring 240.

Preferably, the setting ring 245 is arranged on the spring retaining ring 250 so as to face the tool receptacle 140. In this case, the spring retaining ring 250 is designed to act on the setting ring 245 such that undesired movement of the setting ring 245 can be prevented. Preferably, the spring retaining ring 250 acts on the setting ring 245 in the axial direction 202 toward the tool receptacle 140.

Furthermore, FIG. 2 illustrates the housing cover 177, which is arranged preferably in a rotationally fixed manner on the housing 105. Preferably, the housing cover 177 forms an interior 272, in which the torque setting device 139 is arranged. On an outer circumference 271 of the housing cover 177 the sleeve 130 is arranged. Preferably, the sleeve 130 is arranged on the outer circumference 271 of the housing cover 177 so as to be rotatable in the circumferential direction 201 of the drive unit 180.

Furthermore, the torque clutch 125 is preferably arranged in the housing portion 211. The torque clutch 125 has preferably a pressure plate 235. The pressure plate 235 is arranged preferably at the second axial end 266 of the compression spring 240 and is thus acted on thereby. Preferably, the compression spring 240 bears with its second axial end 266 on the pressure plate 235. Preferably, the pressure plate 235 has cutouts 236, wherein the at least two bars 244 pass through the cutouts 236.

Furthermore, the ring gear 280, arranged facing the torque setting device 139, has receptacles 282 formed so as to face the torque setting device 139. Arranged in the receptacles 282 is at least one pressure element, which is not illustrated. According to one embodiment, the pressure element is in the form of a ball. The pressure elements are acted on by a compressive force of the compression spring 240. In this case, the ring gear 280 is coupled rigidly to a tool carrier 283 until the predefined or preset torque is reached. The tool carrier 283 is preferably connected to the output shaft 295 or to the tool receptacle 140. If the predefined or preset torque is exceeded, the torque clutch 125 is activated, with the result that the rigid connection is disconnected. In this case, the ring gear 280 is moved in the axial direction 202 such that the pressure elements slip out of the receptacles 282 and a relative movement of the ring gear 280 with respect to the tool carrier 283 takes place. The individual parts of the torque clutch 125 do not corotate with the driveshaft 294 or the output shaft 295, with the result that undesired shifting of the setting unit 244 of the torque setting device 139 caused by abrupt braking can be prevented. The torque clutch 125 as such, as described here, is well known from the prior art, and so a detailed description of the torque clutch 125 will not be given here for the sake of simplicity and conciseness of the description.

Furthermore, FIG. 2 shows the working area illumination 150 from FIG. 1, which is arranged on the cylindrical portion 221 or on an outer circumference 223 of the cylindrical portion 221. The working area illumination 150 is arranged or clamped in the axial direction 202 between the threaded region 227 and the housing cover 177.

Figure 3:
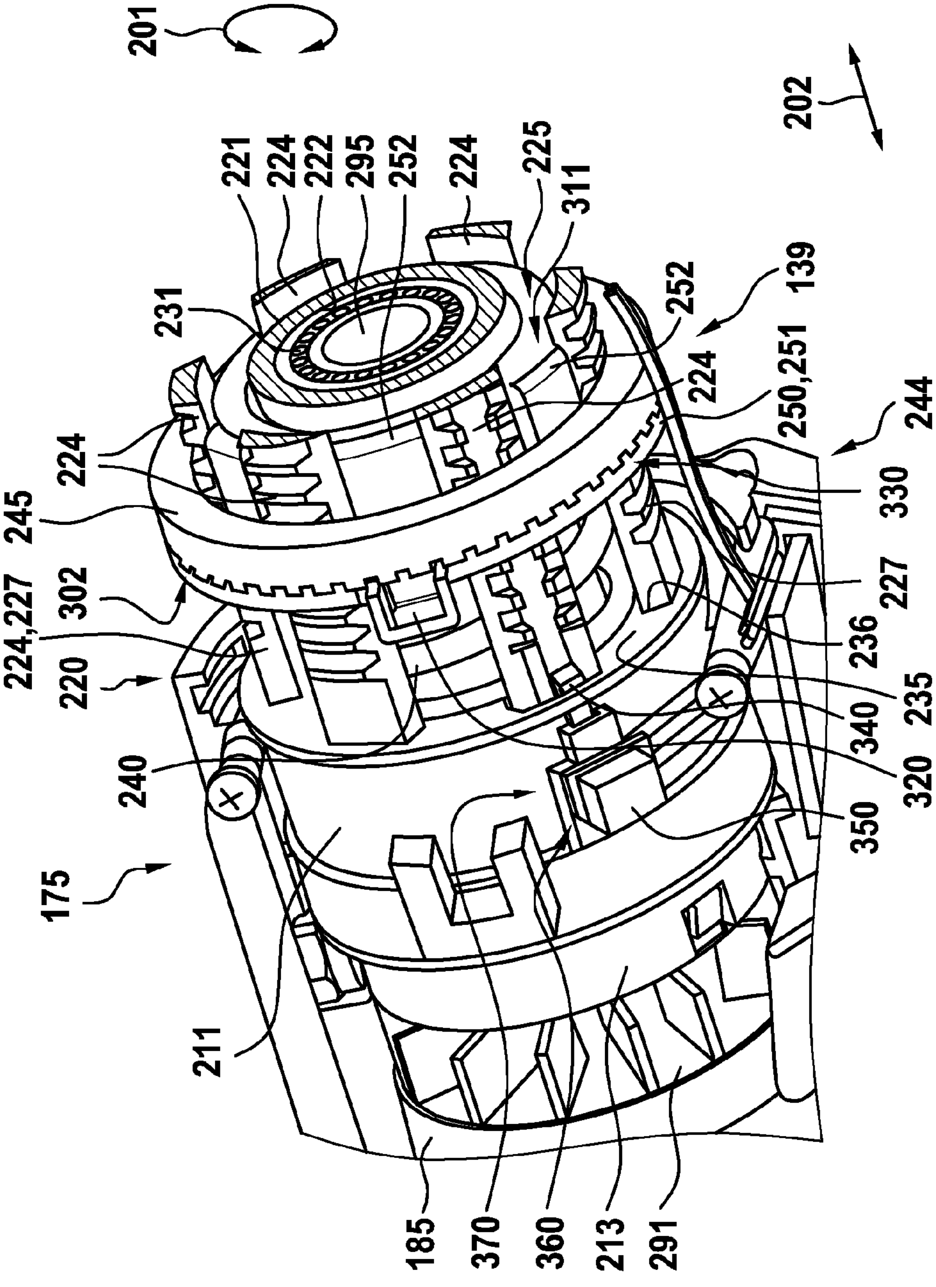
FIG. 3 shows a perspective view of a transmission assigned to the drive unit from FIG. 2 and of the torque setting device from FIG. 1 and FIG. 2, wherein a portion assigned to the torque setting device is illustrated partially in section.

FIG. 3 shows the transmission housing 175 from FIG. 1 and FIG. 2, arranged in the housing 105 of the hand-held power tool 100 from FIG. 1, with the torque setting device 139 from FIG. 1 and FIG. 2, wherein, to clarify the torque setting device 139, the housing cover 177 and the sleeve 130 are not illustrated and the output-side region 220 from FIG. 2 is in section in the axial direction 202 at the bearing element 231. In this case, FIG. 3 illustrates the output-side region 220 with the threaded region 227, which has for example six bars 224.

A receptacle 311 is preferably arranged between in each case two bars 224 that are adjacent in the circumferential direction 201. Preferably, the at least one receiving tab 252 of the spring retaining ring 250 is arranged in the circumferential direction 201 in a receptacle 311. As illustrated, a receiving tab 252 is arranged in the receptacle 311. Preferably, a receiving tab 252 is arranged in each receptacle 311. However, it should be noted that a receiving tab 252 does not have to be arranged in each receptacle 311. Thus, a receiving tab 252 can be arranged in the circumferential direction 201 at a regular spacing, for example in every second receptacle 311, or at an irregular spacing.

Furthermore, the spring retaining ring 250 has, as illustrated, an annular main body 251. Arranged on the annular main body 251 is, for example, a receptacle 320. The receptacle 320 is arranged preferably on a side of the spring retaining ring 250 facing the drive motor 185. In this case, the receptacle 320 is in the form of an axial widening.

In the receptacle 320, a separate setting tool 135 from FIG. 1 is arrangeable for torque setting. To set the predefined torque, preferably the setting ring 245 is rotatable by being acted on via the receptacle 320 in the circumferential direction 201. In this case, the setting ring 245 is moved in the axial direction 202 by being rotated in the circumferential direction 201. The setting unit 244 or the setting ring 245 and the spring retaining ring 250 are in this case always arranged in the threaded region 227.

Preferably, the receptacle 320 of the spring retaining ring 250 is assigned to the cutout 132 in the sleeve 130 from FIG. 1 and FIG. 2. A separate setting tool, for example the setting tool 135 from FIG. 1, passes, in order to set the predefined torque, through the cutout 132 in the sleeve 130 so as to be arranged in the receptacle 320 of the spring retaining ring 250. Furthermore, the setting ring 245 has a toothing 330 on its side 302 facing the drive motor 185.

Furthermore, FIG. 3 illustrates the pressure plate 235, which preferably has a number of receptacles 236 for receiving the bars 224 that corresponds to the number of bars 224. According to one embodiment, the pressure plate 235 is connected to a switching device 370. The switching device 370 has preferably a sensor element 350. The sensor element 350 is preferably arranged on an outer circumference of the housing portion 211. To this end, the housing portion 211 has a holder 360.

Preferably, the holder 360 is formed in one piece with the housing portion 211. However, the holder 360 can also be arranged on the housing portion 211 via any desired connection, for example an adhesive bond.

The switching device 370 is preferably assigned an actuating element 340. The actuating element 340 is connected to the pressure plate 235. Preferably, the actuating element 340 has an elongate main body with a blocking element, wherein the blocking element is arranged on a side of the pressure plate 235 that faces the tool receptacle 140. In this case, the actuating element 340 is designed to transmit a relative movement of the pressure plate 235 in the axial direction 202 to the switching device 370. In this case, the sensor element 350 detects the relative movement of the pressure plate 235. Preferably, the sensor element 350 is a position sensor. If the predefined torque is exceeded, a relative movement of the pressure plate 235 in the axial direction 202 takes place, with the result that the switching device 370 is activated for deactivating the drive unit 180.

Figure 4:
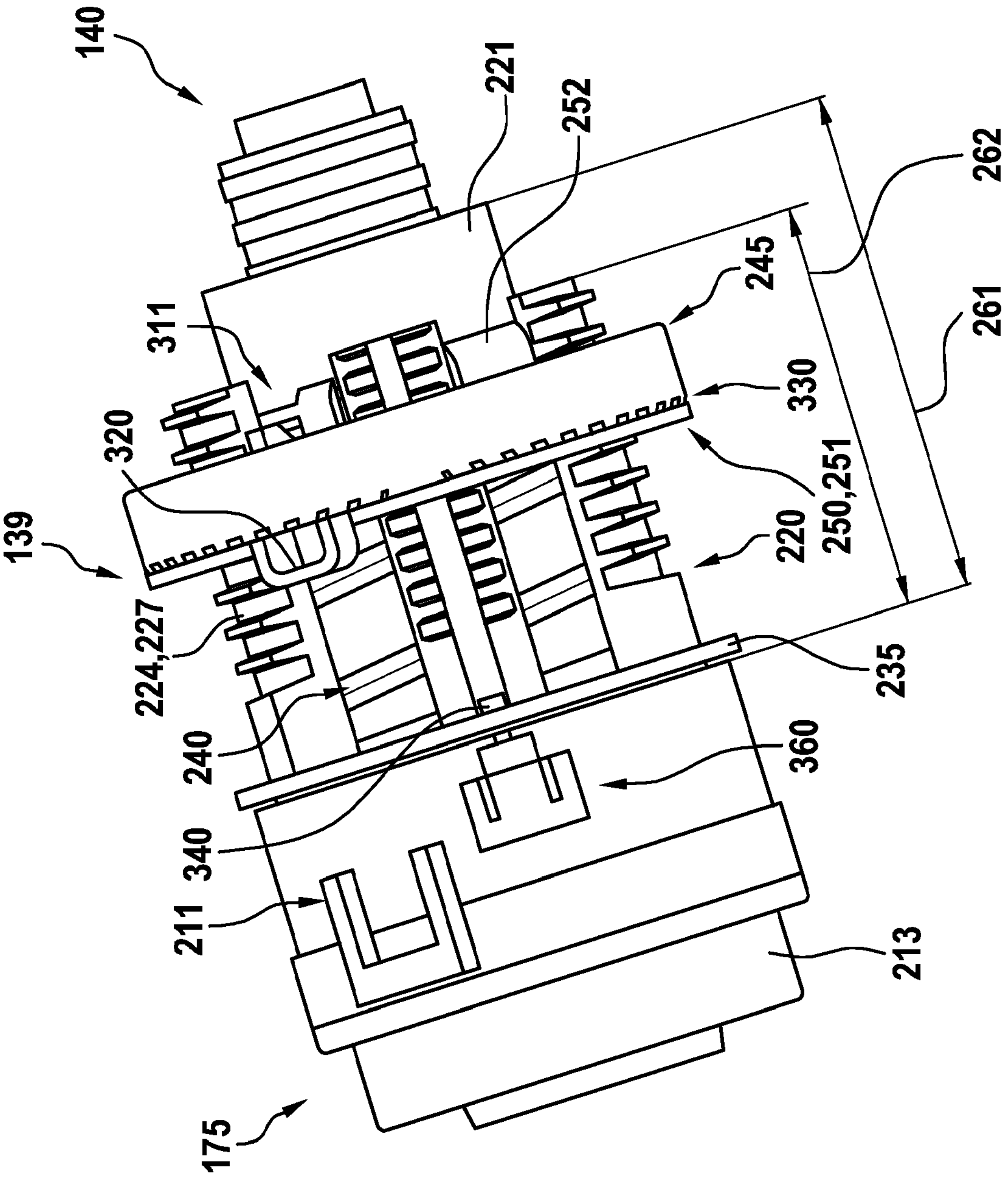
FIG. 4 shows a perspective view of the transmission with the torque setting device from FIG. 1 to FIG. 3.

FIG. 4 shows the transmission housing 175 with the torque setting device 139 from FIG. 1 to FIG. 3. FIG. 4 illustrates the length 261 of the cylindrical portion 221 and the length 262 of the threaded region, wherein, as described above, the length 261 is preferably greater than the length 262. However, the lengths 261, 262 may also be the same and, according to one variant, it is likewise possible for the length 262 to be greater than the length 261. Furthermore, FIG. 4 shows the holder 360 of the sensor element 350 from FIG. 3 on the housing portion 211.

Figure 5:
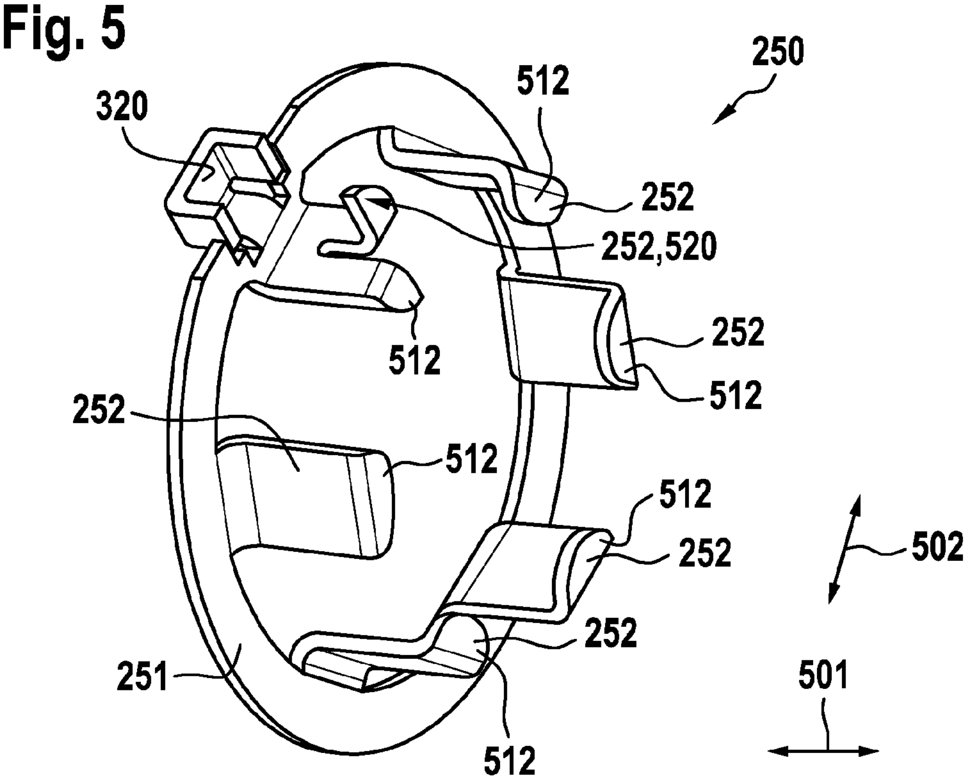
FIG. 5 shows a perspective view of a spring retaining ring assigned to the torque setting device from FIG. 1 to FIG. 4.

FIG. 5 shows the spring retaining ring 250 from FIG. 2 to FIG. 4 with its annular main body 251, on which preferably the at least one receiving tab 252 is arranged. As illustrated, and by way of example, the spring retaining ring 250 has six receiving tabs 252, which are arranged in the axial direction 501 of the spring retaining ring 250. At its right-hand end in the illustration, each of the receiving tabs 252 has a holding portion 512 that is directed inwardly in a radial direction 502. The first end 265 of the compression spring 240 from FIG. 2 bears on the holding portions 512 in the assembled state. Preferably, the holding region 512 at least partially engages around the compression spring 240.

Furthermore, preferably one receiving tab 252 has a divided holding portion 512. In this case, at least one receiving tab 252 has a portion 520 that is directed outward in a radial direction 502. The portion 520 is preferably designed to fix the setting ring 245 from FIG. 2 and FIG. 3 to the spring retaining ring 250. Furthermore, FIG. 5 shows the receptacle 320, which is preferably arranged on the opposite side from the receiving tabs 252 in the axial direction 501. Preferably, the spring retaining ring 250 is a bent sheet-metal part.

Figure 6:
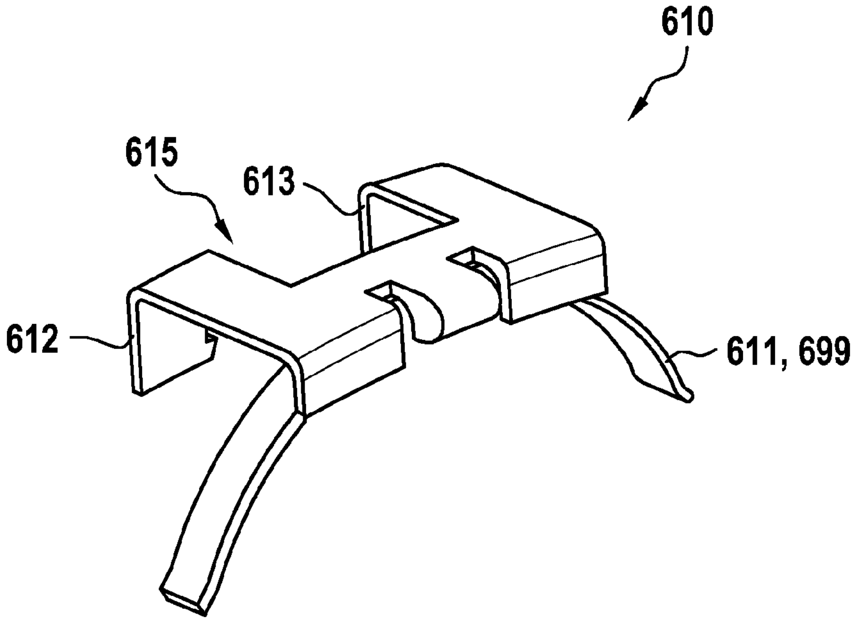
FIG. 6 shows a perspective view of an insert part assigned to the spring retaining ring from FIG. 2 to FIG. 4.

FIG. 6 shows an insert part 610 which is assigned to the spring retaining ring 250 from FIG. 2 to FIG. 4 and is designed to fix the setting ring 245 from FIG. 2 and FIG. 3 to the spring retaining ring 250. The insert part 610 has an arcuate portion 611, which is preferably arrangeable on the outer circumference of the receiving tabs 252 from FIG. 2 of the spring retaining ring 250. Preferably, the insert part 610 has a force-fitting element 699, which prevents the setting ring 245 from rotating by itself by forming a force fit.

Preferably, the arcuate portion 611 of the insert part 610 is in this case in the form of a force-fitting element 699 assigned to the setting ring 245. In this case, the insert part 610 is arranged on the setting ring 245 and the spring retaining ring 250 such that the force-fitting element 699 of the insert part 610 prevents the setting ring 245 from rotating by itself by forming a force fit between the insert part 610 and the setting ring 245.

It is noted that it is also possible for a plurality of force-fitting elements 699 to be provided. According to a further embodiment, the force-fitting element 699 can also be in the form of a separate part which is fastened to the arcuate portion 611. Preferably, the insert part 610 is a bent sheet-metal part and/or a plastics part.

Furthermore, the insert part 610 has preferably at least one clamp portion 615 for fixing the setting ring 245 to the spring retaining ring 250. As illustrated, the clamp portion 615 has two clamp elements 612, 613. The clamp elements 612, 613 are arrangeable on the annular main body 251 (see FIG. 2) of the spring retaining ring 250.

It should be noted that it is also possible for a plurality of insert parts 610 to be assigned to a spring retaining ring 250. Furthermore, the insert part 610 can also have a plurality of clamp elements 612, 613 or have only one clamping element 612, 613. The insert part 610 can find application on a spring retaining ring 250 without a portion 520 from FIG. 5.

Figure 7:
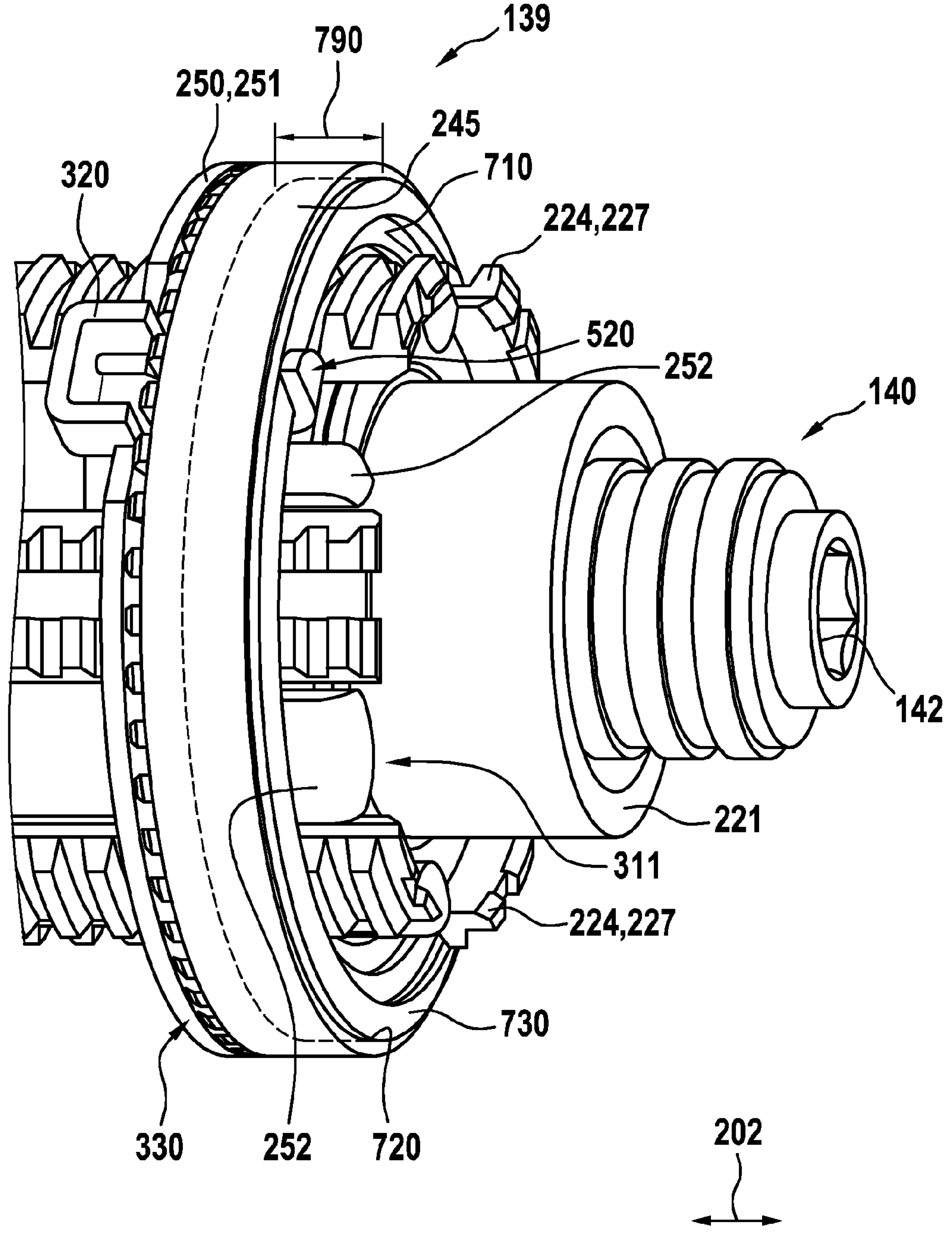
FIG. 7 shows a perspective view of the transmission with the torque setting device from FIG. 2 to FIG. 4, wherein the setting ring is assigned a force-fitting element.

FIG. 7 shows the torque setting device 139 with the setting ring 245 and the spring retaining ring 250 from FIG. 2 to FIG. 4, and with a force-fitting element 730. Preferably, the force-fitting element 730 is arranged at least regionally between the setting ring 245 and the spring retaining ring 250. The force-fitting element 730 is preferably designed to prevent the setting ring 245 from rotating by itself by forming a force fit between the spring retaining ring 250 and the force-fitting element 730.

Preferably, the force-fitting element 730 is in the form of a ring. However, it is possible for the force-fitting element 730 also to be in the form of a ring segment. Furthermore, it is also possible for a plurality of force-fitting elements 730 to be provided.

Preferably, the setting ring 245 has a groove 720 for at least partially receiving the force-fitting element 730. As illustrated, the setting ring 245 has the groove 720 on an end side 710 facing the portion 520. Preferably, the groove 720 is in the form of an annular groove. Furthermore, the setting ring 245 can also have a plurality of grooves 720. In this case, the grooves 720 can be in the form for example of ring segments.

Preferably, the force-fitting element 730 is connected to the setting ring 245 for conjoint rotation. In particular, the force-fitting element 730 is arranged in the groove 720 of the setting ring 245 preferably for conjoint rotation.

In this case, the force-fitting element 730 is fixed in the groove 720 of the setting ring 245 preferably by a form fit, force fit, friction fit and/or by an adhesive bond and/or welded connection. Furthermore, the force-fitting element 730 can also be arranged on the end side of the setting ring 245 facing away from the portion 520.

As illustrated, the force-fitting element 730 has an associated length 790 in the axial direction 202 of the drive unit 180. Furthermore, the groove 720 has an associated depth (810 in FIG. 8). Preferably, the length 790 of the force-fitting element 730 is greater than the depth (810 in FIG. 8) of the groove 720, or the force-fitting element 730 surmounts the groove 720 in the axial direction 202 of the drive unit 180, or protrudes from the groove 720. Preferably, the force-fitting element 730 comprises sheet metal, plastic and/or elastomer.

Figure 8:
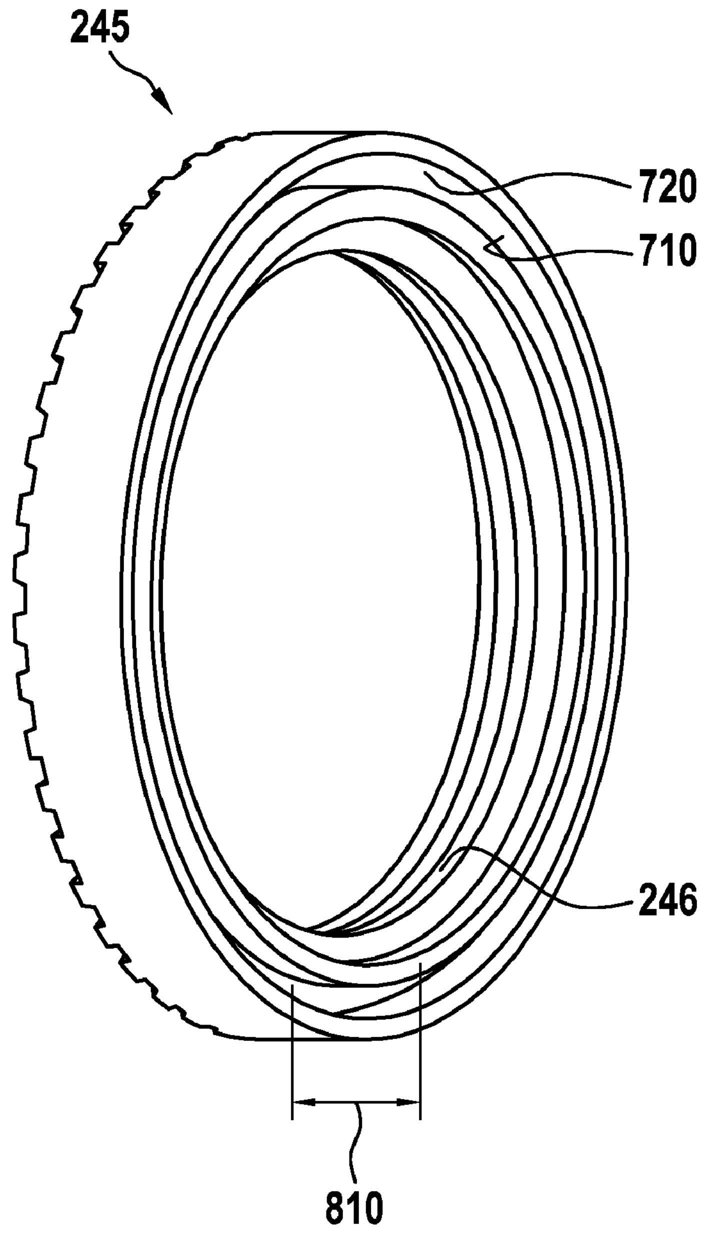
FIG. 8 shows a perspective view of the setting ring from FIG. 7.

FIG. 8 shows the setting ring 245 from FIG. 7 with its groove 720 for arranging the force-fitting element 730 from FIG. 7. As illustrated, the groove 720 in the form of an annular groove has an associated depth 810.

It should be noted that the insert part 610 from FIG. 6 can be arranged with its force-fitting element 699 according to one embodiment at least partially, preferably entirely in the groove 720 of the setting ring 245 in order to form the force fit. In this case, it is possible to dispense with the force-fitting element 730 from FIG. 7. According to a further embodiment, the force-fitting element 699 from FIG. 6 can bear on the force-fitting element 730 from FIG. 7 and thus form a force fit jointly with the force-fitting element 730 from FIG. 7.

The invention claimed is:

1. A hand-held power tool, comprising:

a housing;

a tool receptacle; and at least one drive unit arranged in the housing and configured to drive the tool receptacle, wherein the tool receptacle is designed to receive an application tool, wherein the tool receptacle has a torque setting device configured to set a predefined torque at least within predefined limits, wherein the torque setting device has a threaded region, and a spring-loaded setting unit, operatively connected to the threaded region, for setting the predefined torque,
wherein the torque setting device includes a compression spring which is arranged coaxially with the threaded region, and
wherein the compression spring is arranged such that the threaded region at least partially surrounds the compression spring in an axial direction of the drive unit.

2. The hand-held power tool as claimed in claim 1, wherein:
the torque setting device has a cylindrical portion configured to rotatably mount the tool receptacle and the threaded region,
the cylindrical portion and the threaded region are arranged coaxially with one another,
a receptacle is arranged in a radial direction between the threaded region and the cylindrical portion, and
the compression spring is received within the receptacle.

3. The hand-held power tool as claimed in claim 1, wherein:
the drive unit has a transmission arranged in a transmission housing, and
the torque setting device is arranged in an output-side region of the transmission housing.

4. The hand-held power tool as claimed in claim 1, wherein:
the threaded region has at least two bars which are spaced apart from one another in the circumferential direction, and
the setting unit is arranged on an outer periphery of the at least two bars.

5. The hand-held power tool as claimed in claim 4, wherein:
the at least two bars at least partially have an external thread on their outer periphery in the axial direction of the drive unit, and
the setting unit has an internal thread configured to form a screw connection with the at least two bars.

6. The hand-held power tool as claimed in claim 1, wherein:
the setting unit has a setting ring and a spring retaining ring which are connected together, and
the spring retaining ring includes an insert part with at least one clamp portion which is configured to fix the setting ring to the spring retaining ring.

7. The hand-held power tool as claimed in claim 6, wherein:
the spring retaining ring has, for axially acting on the compression spring in a radial direction of the drive unit, at least one, inwardly directed receiving tab, and
the at least one inwardly directed receiving tab is arranged partially in the receptacle.

8. The hand-held power tool as claimed in claim 7, wherein the at least one inwardly directed receiving tab is arranged in the circumferential direction of the drive unit in a receptacle which is formed between two adjacent bars.

9. The hand-held power tool as claimed in claim 7, wherein the at least one inwardly directed receiving tab has a portion that is directed outward in a radial direction of the drive unit and is designed to fix the setting ring to the spring retaining ring.

10. The hand-held power tool as claimed in claim 7, wherein the spring retaining ring has two inwardly directed receiving tabs.

11. The hand-held power tool as claimed in claim 6, wherein a force-fitting element is arranged at least regionally between the setting ring and the spring retaining ring in order to prevent the setting ring from rotating by itself by forming a force fit between the spring retaining ring and the force-fitting element, or the force-fitting element is assigned to the insert part and is arranged on an end side of the setting ring facing away from the spring retaining ring in order to prevent the setting ring from rotating by itself by forming a force fit between the insert part and the force-fitting element.

12. The hand-held power tool as claimed in claim 11, wherein the setting ring has a groove, configured to at least partially receive the force-fitting element.

13. The hand-held power tool as claimed in claim 12, wherein the groove is an annular groove.

14. The hand-held power tool as claimed in claim 11, wherein the force-fitting element has a length in the axial direction of the drive unit that is greater than a depth of the groove.

15. The hand-held power tool as claimed in claim 11, wherein the force-fitting element comprises sheet metal, plastic and/or elastomer.

16. The hand-held power tool as claimed in claim 6, wherein the spring retaining ring has a receptacle in which a separate setting tool is arranged, and wherein, to set the predefined torque, the setting ring is rotatable in the circumferential direction of the drive unit by being acted upon via the receptacle, and the setting ring is movable in the axial direction of the drive unit by the rotation.

17. The hand-held power tool as claimed in claim 6, wherein:
a sleeve is arranged on an outer side of the housing, said sleeve having a cutout assigned to the receptacle of the spring retaining ring, and
a separate setting tool for setting the predefined torque passes through the cutout.

18. The hand-held power tool as claimed in claim 1, wherein:
the setting unit is movable on the threaded region between a first axial position and a second axial position, and
the first axial position and the second axial position are arranged between a first axial end and the second axial end of the compression spring.

19. The hand-held power tool as claimed in claim 1, further comprising a torque clutch having a pressure plate is arranged on a drive-side end side of the receptacle, wherein:
the compression spring bears on the pressure plate,
the pressure plate is connected to a switching device,
if the predefined torque is exceeded, a relative movement of the pressure plate in the axial direction of the drive unit activates the switching device for deactivating the drive unit.

20. The hand-held power tool as claimed in claim 1, wherein the hand-held power tool is a screwdriver.

* * * * *